United States Patent
Lee (10) Patent No.: US 10,005,372 B2
(45) Date of Patent: Jun. 26, 2018

(54) VIRTUAL ASSESSMENT OF BATTERY STATE OF HEALTH IN ELECTRIFIED VEHICLES

(71) Applicant: FORD GLOBAL TECHNOLOGIES, LLC, Dearborn, MI (US)

(72) Inventor: Tae-Kyung Lee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 15/051,300

(22) Filed: Feb. 23, 2016

(65) Prior Publication Data

US 2017/0240064 A1    Aug. 24, 2017

(51) Int. Cl.
| B60L 11/18 | (2006.01) |
| B60K 6/40 | (2007.10) |
| B60L 3/12 | (2006.01) |
| H01M 10/48 | (2006.01) |

(52) U.S. Cl.
CPC ............ *B60L 11/1851* (2013.01); *B60K 6/40* (2013.01); *B60L 3/12* (2013.01); *B60L 11/1857* (2013.01); *H01M 10/48* (2013.01); *B60L 2240/12* (2013.01); *B60L 2240/14* (2013.01); *B60L 2240/54* (2013.01); *B60Y 2200/92* (2013.01); *B60Y 2306/15* (2013.01); *H01M 2220/20* (2013.01); *Y02T 10/7005* (2013.01); *Y02T 10/705* (2013.01); *Y10S 903/951* (2013.01)

(58) Field of Classification Search
CPC ........... B60L 11/1852; B60L 3/12; B60K 6/40
See application file for complete search history.

(56) References Cited

U.S. PATENT DOCUMENTS

| 6,362,602 | B1 * | 3/2002 | Kozarekar .......... B60L 11/1851 320/160 |
| 2008/0208494 | A1 | 8/2008 | Holz et al. |
| 2011/0082621 | A1 | 4/2011 | Berkobin et al. |
| 2012/0283902 | A1 * | 11/2012 | Kusumi .................. B60K 6/46 701/22 |
| 2013/0090900 | A1 | 4/2013 | Gering |
| 2013/0158755 | A1 | 6/2013 | Tang et al. |
| 2014/0214311 | A1 | 7/2014 | Stevens et al. |
| 2016/0169975 | A1 * | 6/2016 | Lin .................... G01R 31/3662 702/63 |

* cited by examiner

*Primary Examiner* — Khoi H Tran
*Assistant Examiner* — Kelly D Williams
(74) *Attorney, Agent, or Firm* — David Kelley; Brooks Kushman P.C.

(57) ABSTRACT

A vehicle includes a traction battery and a controller programmed to operate the traction battery according to an estimated value of a battery state of health parameter. The estimated value is updated based on drive cycle parameters of the vehicle over a time interval. The state of health parameters include a battery capacity and a resistance of the traction battery.

17 Claims, 5 Drawing Sheets

VIRTUAL ASSESSMENT OF BATTERY STATE OF HEALTH IN ELECTRIFIED VEHICLES

TECHNICAL FIELD

This application is generally related to estimating state of health parameters for a traction battery in a vehicle.

BACKGROUND

Electrified vehicles include hybrid electric vehicles (HEV) and battery electric vehicles (BEV). Electrified vehicles include a traction battery to store energy to be used for propulsion and other purposes. The traction battery is generally operated using various parameters that are defined during the development phase. Over time, operating parameters of the traction battery change causing changes in performance of the traction battery.

SUMMARY

In some configurations, a vehicle includes a traction battery. The vehicle also includes a controller programmed to operate the traction battery according to an estimated value of a state of health parameter and to change the estimated value based on statistical parameters describing vehicle motion during a drive cycle and parameters describing a relationship between vehicle motion during past drive cycles and resulting current flow through the traction battery.

Some configurations may include one or more of the following features. The vehicle in which the state of health parameter is a capacity of the traction battery. The vehicle in which the state of health parameter is an internal impedance of the traction battery. The vehicle in which the statistical parameters include a mean positive velocity of the vehicle. The vehicle in which the statistical parameters include a standard deviation of acceleration of the vehicle. The vehicle in which the controller is programmed to change the estimated value based on a second set of statistical parameters describing current flow through the traction battery during a drive cycle and parameters describing a relationship between current flow through the traction battery during past drive cycles and the state of health parameter. The vehicle in which the controller is programmed to receive temperature data and change the estimated value further based on a temperature associated with the drive cycle. The vehicle in which the parameters describing the relationship are derived from a regression function such that that the estimated value is within a predetermined confidence interval of a true value of the state of health parameter.

In some configurations, a vehicle power system includes a controller programmed to operate a traction battery according to an estimated value of a state of health parameter and to change the estimated value based on statistical parameters describing vehicle motion during a drive cycle and parameters describing a relationship between vehicle motion during past drive cycles and resulting changes to the state of health parameter.

Some configurations may include one or more of the following features. The vehicle power system in which the state of health parameter is a capacity of the traction battery. The vehicle power system in which the state of health parameter is an internal impedance of the traction battery. The vehicle power system in which the statistical parameters include a mean positive velocity of the vehicle. The vehicle power system in which the statistical parameters include a standard deviation of acceleration of the vehicle. The vehicle power system in which the controller is programmed to receive temperature data and change the estimated value further based on a temperature associated with the drive cycle. The vehicle power system in which the parameters describing the relationship are derived from a regression function such that that the estimated value is within a predetermined confidence interval of a true value of the state of health parameter.

In some configurations, a method of operating a battery in a vehicle includes operating, by a controller, the battery according to an estimated value of a battery state of health parameter. The method also includes changing, by the controller, the estimated value based on statistical parameters describing vehicle motion during a drive cycle and parameters describing a relationship between vehicle motion during past drive cycles and resulting current flow through the battery.

Some configurations may include one or more of the following features. The method may include changing, by the controller, the estimated value further based on a temperature associated with the drive cycle. The method may include changing, by the controller, the estimated value further based on statistical parameters describing current flow through the battery during a drive cycle and parameters describing a relationship between current flow through the battery during past drive cycles and the state of health parameter. The method may include describing the relationship according to a regression function such that that the estimated value is within a predetermined confidence interval of a true value of the state of health parameter.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
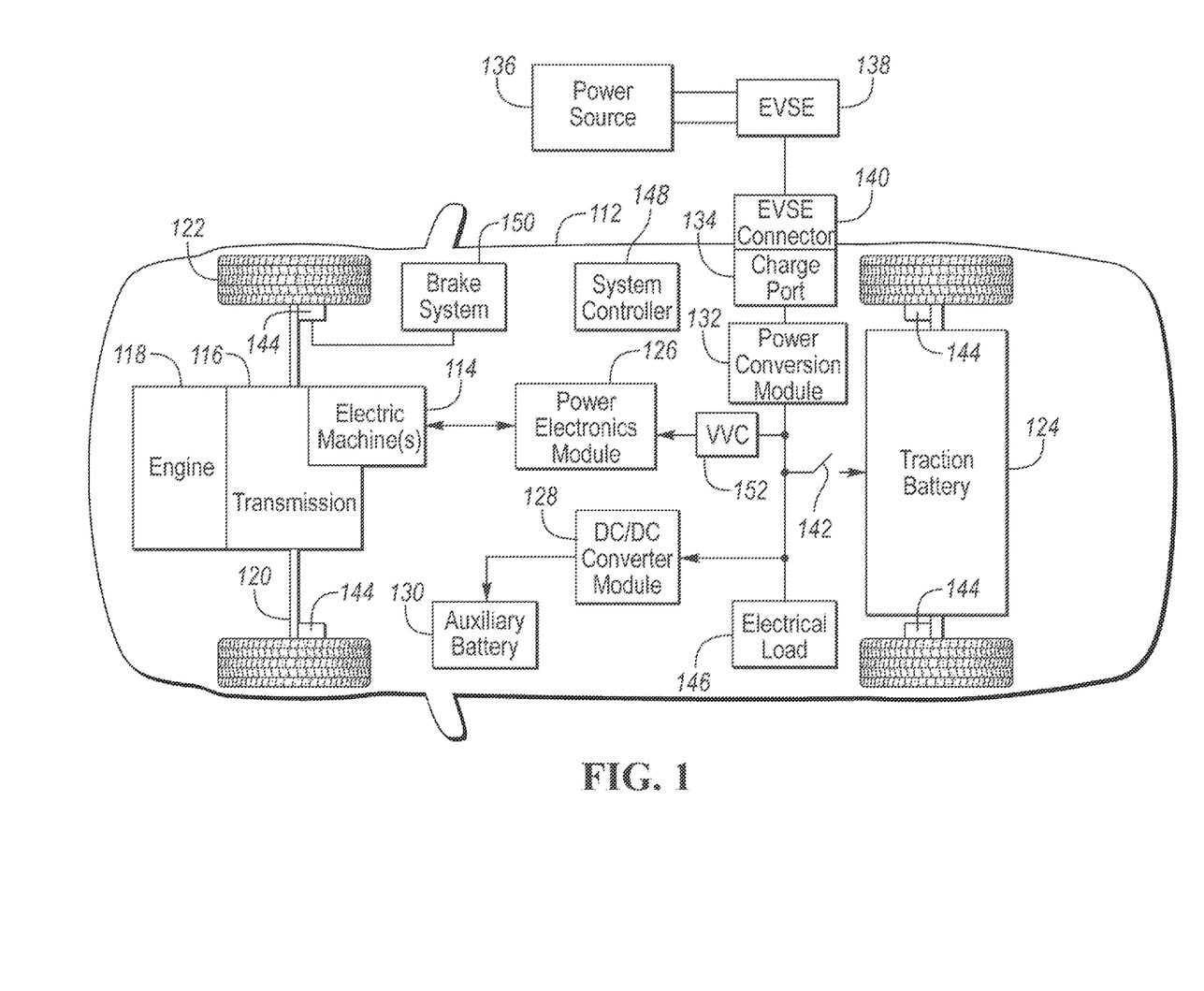
FIG. 1 is a diagram of a hybrid vehicle illustrating typical drivetrain and energy storage components.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
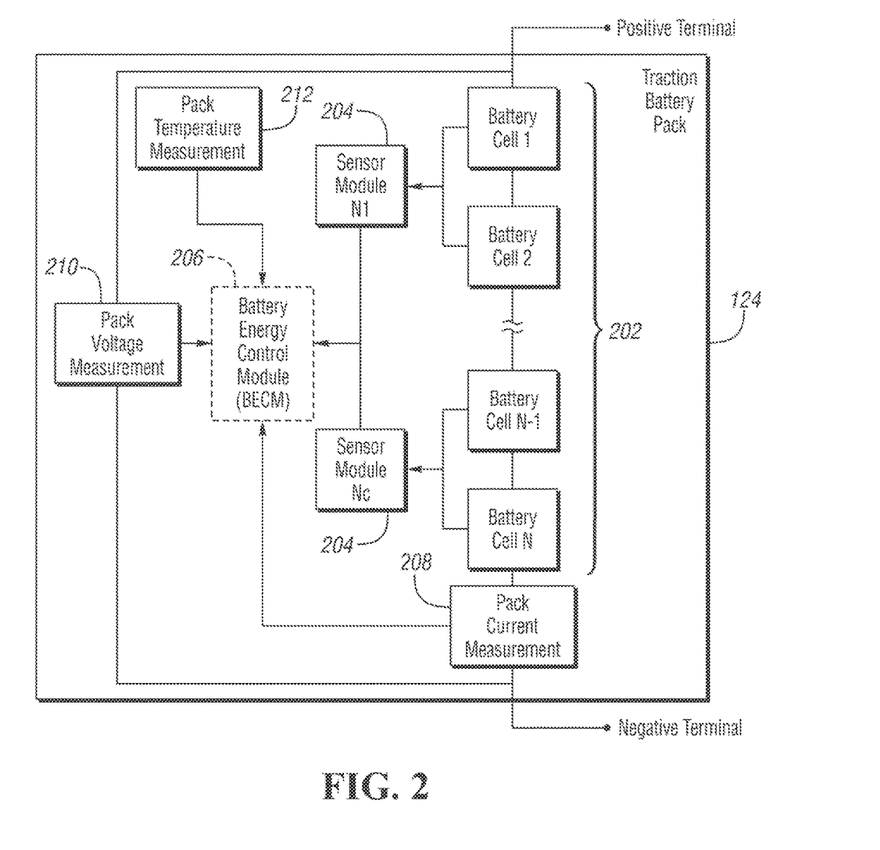
FIG. 2 is a diagram of a possible battery pack arrangement comprised of multiple cells, and monitored and controlled by a Battery Energy Control Module.

The traction battery 124 may be constructed from a variety of chemical formulations. Typical battery pack chemistries may be lead acid, nickel-metal hydride (NIMH) or Lithium-Ion. FIG. 2 shows the traction battery pack 124 as a simple series configuration of N battery cells 202. The traction battery 124, however, may be composed of any number of individual battery cells connected in series or parallel or some combination thereof. A battery management system may have one or more controllers, such as a Battery Energy Control Module (BECM) 206, that monitor and control the performance of the traction battery 124. The traction battery 124 may include sensors to measure various pack level characteristics. The traction battery 124 may include one or more pack current measurement sensors 208, pack voltage measurement sensors 210, and pack temperature measurement sensors 212. The BECM 206 may include circuitry to interface with the pack current sensors 208, the pack voltage sensors 210 and the pack temperature sensors 212. The BECM 206 may have non-volatile memory such that data may be retained when the BECM 206 is in an off condition. Retained data may be available upon the next key cycle.

In addition to the pack level characteristics, there may be battery cell 202 level characteristics that are measured and monitored. For example, the terminal voltage, current, and temperature of each cell 202 may be measured. A system may use one or more sensor modules 204 to measure the battery cell 202 characteristics. Depending on the capabilities, the sensor modules 204 may measure the characteristics of one or multiple of the battery cells 202. The traction battery 224 may utilize up to $N_c$ sensor modules 204 to measure the characteristics of all the battery cells 202. Each of the sensor modules 204 may transfer the measurements to the BECM 206 for further processing and coordination. The sensor modules 204 may transfer signals in analog or digital form to the BECM 206. In some configurations, the functionality of the sensor modules 204 may be incorporated internally to the BECM 206. That is, the hardware of the sensor modules 204 may be integrated as part of the circuitry in the BECM 206 and the BECM 206 may handle the processing of raw signals. The BECM 206 may also include circuitry to interface with the one or more contactors 142 to open and close the contactors 142.

It may be useful to calculate various characteristics of the battery pack. Quantities such as battery power capability, battery capacity, and battery state of charge may be useful for controlling the operation of the traction battery 124 as well as any electrical loads receiving power from the traction battery 124. Battery power capability is a measure of the maximum amount of power the traction battery 124 can provide or the maximum amount of power that the traction battery 124 can receive. Knowing the battery power capability allows the electrical loads to be managed such that the power requested is within limits that the traction battery 124 can handle.

Battery capacity is a measure of a total amount of energy that may be stored in the traction battery 124. The battery capacity (often represented by variable Q) may be expressed in units of Amp-hours. Values related to the battery capacity may be referred to as amp-hour values. The battery capacity of the traction battery 124 may decrease over the life of the traction battery 124.

State of charge (SOC) gives an indication of how much charge remains in the traction battery 124. The SOC may be expressed as a percentage of the total possible charge remaining in the traction battery 124. When the SOC is at one hundred percent, the traction battery 124 may be charged to the battery capacity. The SOC value may be output to inform the driver of how much charge remains in the traction battery 124, similar to a fuel gauge. The SOC may also be used to control the operation of an electric or hybrid-electric vehicle. Calculation of SOC can be accomplished by a variety of methods. One possible method of calculating SOC is to perform an integration of the traction battery current over time. This is well-known in the art as ampere-hour integration.

An energy management system or vehicle power system may operate the traction battery 124 to manage the state of charge of the traction battery 124. The traction battery 124 may be charged or discharged according to a target state of charge compared to a present state of charge. For example, when the present state of charge is greater than the target state of charge, the traction battery 124 may be discharged. Operation of the traction battery 124 may be achieved by commanding a torque of the electric machines 114 to draw current from or provide current to the traction battery 124. Operation of the traction battery 124 may further involve commanding operation of the engine 118 to provide power to the electric machines 114 to charge the traction battery 124.

Values that are often computed for the traction battery 124 may be state of health (SOH) related parameters. The SOH parameters may provide an indication of the age of the traction battery 124. The SOH parameters may also provide information on the state of the battery and how the battery has degraded over time. The SOH parameters may include a computed battery capacity and a battery internal impedance. The SOH parameters may indicate a change to the battery capacity and the battery internal impedance. The battery internal impedance may be represented as a resistance value. As the traction battery 124 ages, the battery internal impedance may change. The battery internal impedance generally increases as the battery degrades. Knowledge of the battery internal impedance and battery capacity allows for improved control of the traction battery 124. Various methods are available to determine the SOH of the traction battery 124. A battery age indicator may be output and displayed based on the battery capacity and/or the battery internal impedance values. For example, the battery capacity and/or battery internal impedance values may be compared to corresponding values at a beginning of battery life to determine an approximate age of the traction battery.

Battery SOH prediction algorithms generally monitor battery related quantities such as voltages and currents. For example, one factor for battery aging is the amount of current that flows through the battery. Algorithms may function by measuring the current through the battery and estimating a battery age parameter based on the accumulated current flow. Some battery SOH algorithms may attempt to measure or estimate the battery internal impedance using voltage and current measurements. However, it is possible to predict battery SOH based on drive cycle information if a relationship between driving cycles and battery SOH can be identified.

A driving cycle may be characterized by a number of quantities relating to velocity and acceleration of the vehicle. The drive cycle may be characterized by statistical parameters that describe vehicle motion during the drive cycle. The characterization may include one or more of a standard deviation of velocity, a mean positive acceleration, a minimum acceleration, a percentage of driving time under positive acceleration, a percentage of driving time under negative acceleration, a mean positive velocity, a percentage of idle time, and a number of stops per mile. The quantities may analyzed for various drive cycles to determine the impact of the variable on battery SOH. After some analysis, the mean positive velocity and the standard deviation of acceleration are the most relevant to battery SOH. Intuitively, this may be understood as higher velocity and faster accelerations may result in higher battery usage. For example, the traction battery may be subject to larger currents at higher speeds and accelerations.

The mean positive velocity and the standard deviation of acceleration may be utilized to estimate statistical variables related to the battery current. A standard deviation of the battery current and a mean absolute battery current may be derived from the drive cycle properties. The battery statistical variables may then be used to predict a change in battery SOH parameters at an arbitrary time in the future. For example, a change in battery capacity and/or internal impedance may be computed from a statistical analysis based on the battery current parameters.

Figure 3:
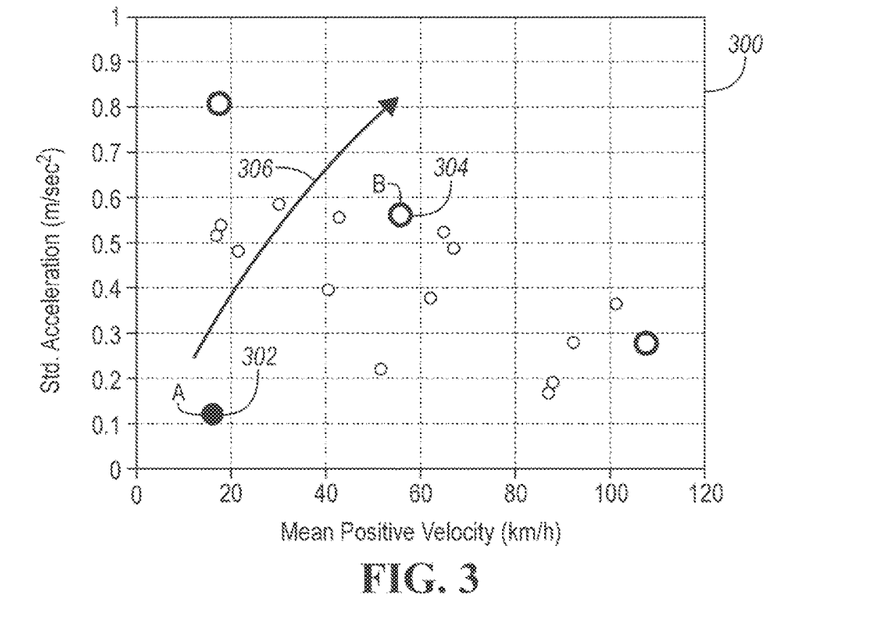
FIG. 3 is a plot of mean positive velocity and standard deviation of acceleration for different drive cycles.

FIG. 3 is a plot 300 depicting standard deviation of acceleration and mean positive velocity for a variety of drive cycles. Each point on the plot may represent a particular drive cycle. For example, point A 302 may represent a mild drive cycle. Note that point A has relatively low mean positive velocity and standard deviation of acceleration. Point B 304 may represent an aggressive drive cycle. As the points move in the direction indicated by the line 306, more aggressive battery operation may be observed. More aggressive battery operation may lead to more rapid battery aging or changing of battery SOH parameters.

Figure 4:
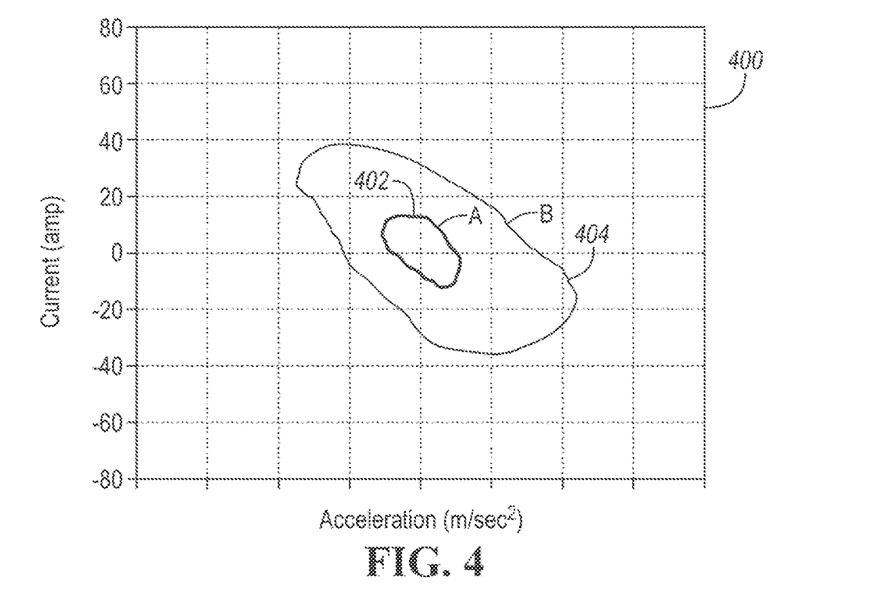
FIG. 4 is a plot depicting possible ranges of battery current values as a function of acceleration for different drive cycles.

FIG. 4 depicts a plot 400 that indicates possible distribution of battery current versus vehicle acceleration. For the mild drive cycle (denoted by A), the distribution may fall within a first area 402. For the aggressive drive cycle (denoted by B), the distribution may fall within a second area 404. Note that the second area 404 contains a broader range of battery current and acceleration values than the first area 402. Faster accelerations/decelerations may be indicative of a more aggressive drive cycle. In addition, faster accelerations/decelerations may result in larger magnitude battery currents as the battery may be utilized to a greater extent to satisfy the faster accelerations/decelerations.

A regression analysis may be performed to find a regression equation that relates independent variables to a dependent variable. Data for a plurality of drive cycles may be sampled or measured during the drive cycle and statistical values may be derived from the data. Velocity may be measured during the drive cycle at periodic intervals. Acceleration may be measured during the drive cycle at periodic intervals. The acceleration value may be based on an output of an acceleration sensor or may be computed as a derivative of the velocity. In addition, battery current may be measured during each of the drive cycles. The measured values may be sampled at periodic intervals. At the end of each of the drive cycles, a series of velocity, acceleration, and battery currents values may be available. A mean or average of each variable may be computed as the summation of the values over all of the time intervals divided by the number of time intervals. The standard deviation may be computed as:

$$\sigma(x) = \sqrt{\frac{1}{n}\sum_{i=1}^{n}(x_i - \mu)^2} \quad (1)$$

where $\mu$ is the mean value, $x_i$ is the value of the variable from sample i, and n is the number of samples taken.

A regression model may be defined as:

$$y = \beta_0 + \beta_1 x_1 + \ldots + \beta_p x_p + \varepsilon \quad (2)$$

where p is the number of independent variables, $\beta_i$ is $i^{th}$ coefficient of the regression equation, and i=0, 1, ..., p. The regression analysis may consider N data points of a drive cycles. As such, a matrix corresponding to the x elements may be constructed as:

$$X = \begin{bmatrix} 1 & x_{11} & \cdots & x_{1p} \\ \vdots & \vdots & \ddots & \vdots \\ 1 & x_{N1} & \cdots & x_{Np} \end{bmatrix} \quad (3)$$

where N is the number of data points of a drive cycle.

The parameters of the regression model (or regression coefficients) may be computed as:

$$\hat{\beta} = (X^T X)^{-1} X^T y \quad (4)$$

where X is a N-by-(p+1) matrix and y is a N-by-1 system response matrix. The regression coefficients calculated from a specific y matrix are used to calculate the regressed response $\hat{y}$.

Once the regression parameters are determined, the regression analysis may be expressed as:

$$\hat{y} = \hat{\beta} x \quad (5)$$

where y may be the standard deviation of battery current $y_1$ and the mean absolute battery current $y_2$. The elements of y may be defined as:

$$y_1 = \sigma(i_{batt}) \quad (6)$$

with $\beta 1$ calculated from the y matrix consisting of $y_1$ responses, and $$y_2 = \text{mean}(|i_{batt}|) \quad (7)$$

with $\beta 2$ calculated from the y matrix consisting of $y_2$ responses, and the vector x may be defined as:

$$x = [1 \; \bar{v}_{pos} \; \sigma(a) \; \bar{v}_{pos}\sigma(a) \; \bar{v}_{pos}^2 \; \sigma(a)^2 \; \bar{v}_{pos}\sigma(a)^2] \quad (8)$$

where $v_{pos}$ is the mean positive velocity and $\sigma(a)$ is the standard deviation of the acceleration. Each of the x vectors has p+1 components. The x vectors computed from each data points of a drive cycle may be combined to form the X matrix of equation (3).

The regression matrix, X, may be derived from a sampling of certain data during each of the drive cycles. For a given drive cycle, vehicle data such as vehicle speed and vehicle acceleration may be sampled. In addition, battery current may be sampled. From the vehicle speed, the mean positive velocity may be computed. From the vehicle acceleration, the standard deviation of the vehicle acceleration may be computed. The mean positive velocity and standard deviation of acceleration may be utilized to define the input vector as defined in equation (8). The mean and standard deviation of the battery current may also be computed. These values may be used in the regression analysis to determine the regression coefficients according to equation (4). Once the regression matrix is known, it may be utilized in different drive cycles to estimate the absolute mean battery current and the standard deviation of the battery current according to equations (6) and (7) respectively.

The controller 206 may be programmed with the regression matrix so that the battery current parameters may be estimated or predicted for any drive cycle. The battery current parameters may be estimated without any present knowledge of the control strategies, vehicle control strategies and configurations. The battery current parameters are estimated only from the drive cycle data. The regression matrix may be stored or programmed into the controller 206.

The above analysis derives the battery current parameters from vehicle drive cycle data. However, with some additional computation, state of health (SOH) parameters of the battery may be computed. The procedures to be defined enable the prediction of battery SOH parameters directly from the drive cycle data and temperature within a predetermined uncertainty bounds.

The uncertainty bounds are dependent upon the supervisory control strategies of the hybrid powertrain. The uncertainty bounds may be expressed as:

$$\sigma(i_{batt}) = f_1(x) + \varepsilon_1 \qquad (9)$$

$$\text{mean}(|i_{batt}|) = f_2(x) + \varepsilon_2 \qquad (10)$$

where x is defined by equation (8), and the ε terms are the uncertainty bounds.

The battery SOH may be characterized as a change in battery capacity ($\Delta Q_{batt}$) and/or a change in battery internal impedance during charging ($\Delta R_{int,chg}$) and discharging ($\Delta R_{int,disch}$). The change quantities may be relative to values at the beginning of life (BOL) of the battery. The change values may be expressed relative to the BOL values as follows:

$$\Delta Q_{batt} = Q_{batt,BOL} - Q_{batt} \qquad (11)$$

$$\Delta R_{int,chg} = R_{int,chg} - R_{int,cg,BOL} \qquad (12)$$

$$\Delta R_{int,disch} = R_{int,disch} - R_{int,disch,BOL} \qquad (13)$$

The battery capacity of the battery may be expected to decrease over the life of the battery. The internal impedance values may be expected to increase over the life of the battery. The values of the SOH parameters at the present time may be derived from equations (11-13).

The change in capacity and internal impedances may be related to the battery current parameters, which are, but are not limited to, the standard deviation of battery current and the mean absolute battery current. The battery current parameters may provide a measure of how the battery is used over time. The change in capacity and internal impedances may be expressed as:

$$\Delta Q_{batt} = g_1(\sigma(i_{batt}), \text{mean}(|i_{batt}|)|T, t_{drv}, t_{park}) + \varepsilon_3 \qquad (14)$$

$$\Delta R_{int,chg} = g_2(\sigma(i_{batt}), \text{mean}(|i_{batt}|)|T, t_{drv}, t_{park}) + \varepsilon_4 \qquad (15)$$

$$\Delta R_{int,disch} = g_3(\sigma(i_{batt}), \text{mean}(|i_{batt}|)|T, t_{drv}, t_{park}) + \varepsilon_5 \qquad (16)$$

where T is a temperature associated with the drive cycle, $t_{drv}$ is the elapsed time of a drive cycle, $t_{park}$ is an elapsed time the vehicle is resting. Each change has an associated uncertainty bound, ε.

The functions $g_1$, $g_2$, and $g_3$ may be derived from another regression analysis. For example, $y_1 = G_1(x)$ where y is $\Delta Q_{batt}$, x is $[\sigma(i_{batt}) \text{ mean}(|i_{batt}|)]$, and G represents the regression matrix. Various values for each drive cycle may be computed using a vector similar to equation (8). The regression matrix may be derived by collecting data over a number of drive cycles and generating a vector for each as described previously. For example, battery capacity and battery current may be measured while operating the battery at a variety of operating cycles. In some cases, the battery capacity may be computed from other battery parameters such as current and voltage. Variables that may be varied between the operating cycles may be a temperature profile of the battery, a driving duration, and a parking duration. After completion of the operating cycle, the battery current parameters may be computed from the measurements during the operating cycle. The change in battery capacity may also be determined from the measured data. Note that the regression matrix may be obtained based on simulated or actual drive cycle data.

Equations (14-16) are expressed in terms of the battery current parameters by substituting equation (5) into equations (14-16). The battery current parameters may be expressed as a function of the drive cycle parameters. As a result, the change in capacity and internal impedance may also be expressed as functions of the drive cycle parameters as described by equation (8) as follows:

$$\Delta Q_{batt} = H_1(x|T, t_{drv}, t_{park}) + \varepsilon_Q \qquad (17)$$

$$\Delta R_{int,chg} = H_2(x|T, t_{drv}, t_{park}) + \varepsilon_{R,chg} \qquad (18)$$

$$\Delta R_{int,disch} = H_3(x|T, t_{drv}, t_{park}) + \varepsilon_{R,disch} \qquad (19)$$

The change in battery capacity and internal impedance values may be derived from equations (17-19) directly from the drive cycle parameters. The end result is that battery aging parameters can be derived from the measured vehicle velocity. The controller may store a plurality of regression functions or matrices that correspond to various combinations of temperature, drive time, and park time. For example, the regression matrix may be selected based on a temperature associated with the recently completed drive cycle.

The resulting equations may be implemented in the controller 206. The measured vehicle velocity may be sampled and stored over a predetermined time interval. The predetermined time interval may be based on a predetermined time period such as one day. After the predetermined time interval, the collected vehicle velocity samples may be processed to compute the acceleration. Further, statistical parameters of the velocity (e.g., mean positive velocity) and the acceleration (e.g., standard deviation of acceleration) may be computed. Once these values are known, the vector defined by equation (8) may be computed. In addition to monitoring the vehicle velocity, a temperature, a drive time, and a park time may be measured or received by the controller. For example, temperature may be periodically sampled over the predetermined time interval. The drive time and park time may be determined by monitoring an amount of time that the vehicle is in a drive mode and in a park mode. Park time may include time periods in which the vehicle is in an ignition-off condition. The park time may be used to filter out associated velocity values from the average and standard deviation.

The controller 206 may then select the appropriate function based on the temperature, the drive time, and the park time. The extracted information from the measured vehicle velocity (e.g., from equation (8)) may be input to the function to determine the change in capacity or internal impedance over the predetermined time interval. The estimated value of the state of health parameter is based on statistical parameters describing vehicle motion during a drive cycle. The statistical parameters include mean positive velocity and standard deviation of vehicle acceleration. The estimated value is further based on parameters that describe a relationship between vehicle motion during past drive cycles and resulting current flow through the battery. The estimated value may be further based on parameters describing a relationship between current flow through the battery during past drive cycles and resulting changes to the state of health parameter.

Figure 5:
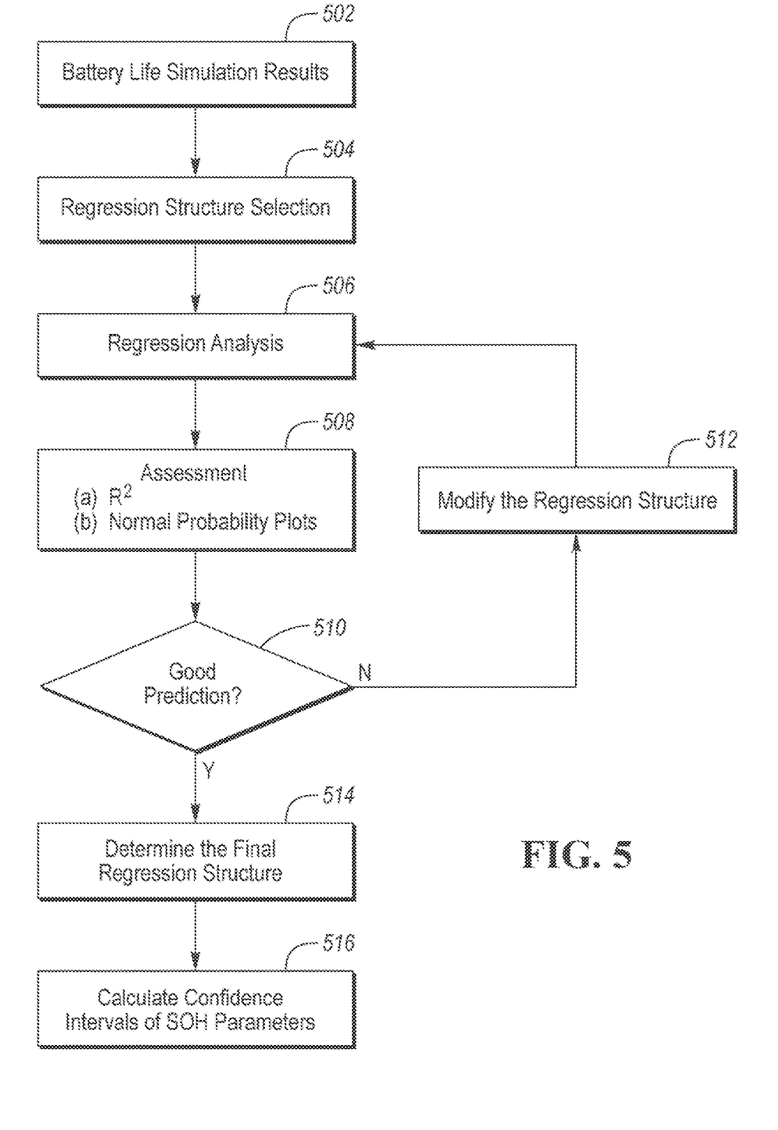
FIG. 5 is a flowchart for a possible sequence of operations for developing a regression structure for parameter identification.
Figure 6:
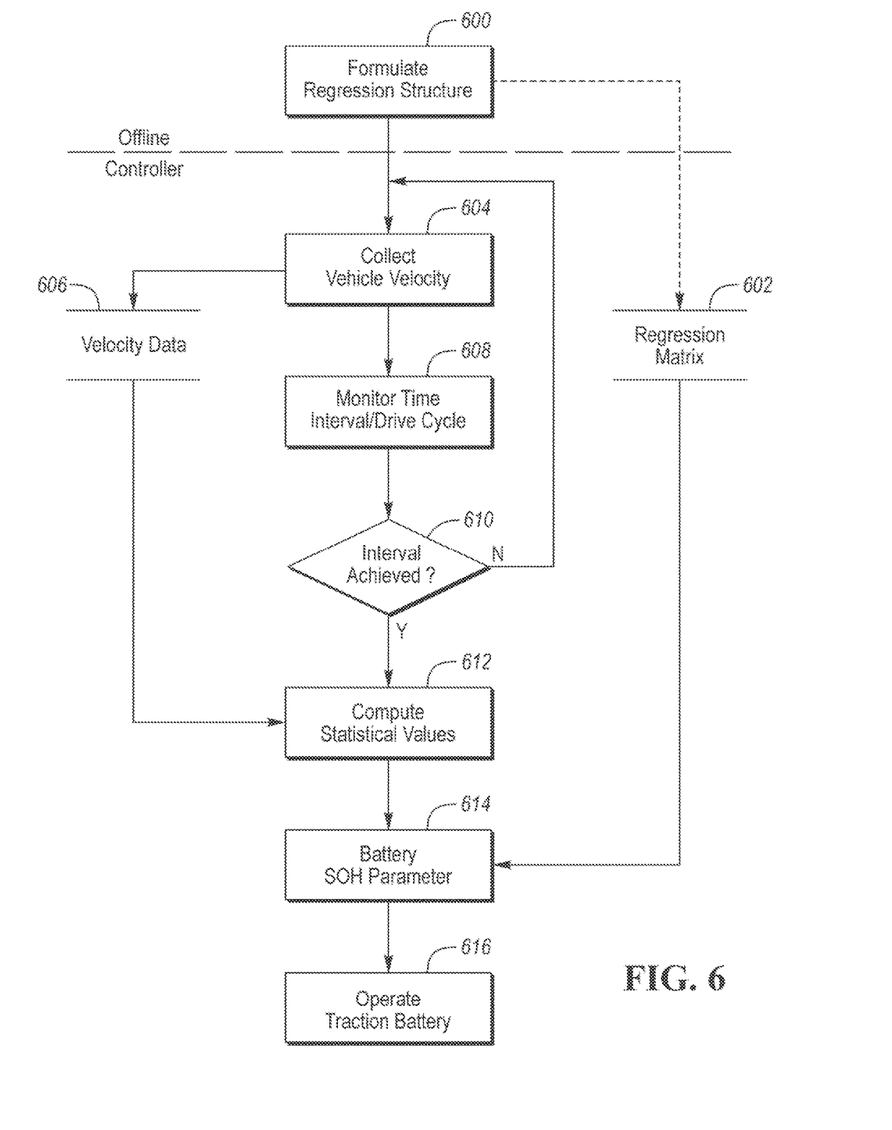
FIG. 6 is a flowchart for a possible sequence of operations for estimating battery state of health parameters.

FIG. 6 depicts a flowchart describing a possible sequence of operations for the described system and method. At operation 600, the regression structure is formulated. Formulating the regression structure may be performed offline based on analysis of previous drive cycle data. FIG. 5 depicts a flowchart describing the general procedure for formulating the regression structure. At operation 502, battery life simulations may be performed and the results collected. Such simulations may be simulated by a model and/or may be derived from actual vehicle operating data. At operation 504, the regression structure may be selected. For example, the vector of quantities for the matrix, X, may be formulated resulting in a vector such as equation (8). At operation 506, a regression analysis may be performed as described previously. For example, collected data for the drive cycle may be processed to compute the regression matrix, and regression coefficients are calculated using the regression matrix and the system response matrix. At operation 508, an assessment of the regression analysis may be performed. For example, the regression matrix and vector may be used to derive parameter values from additional drive cycles (or even previously used ones). For example, an $R^2$ value may be computed to assess the relative quality of the regression. Normal probability distribution plots may be generated and analyzed. At operation 510, a check may be performed to determine if the predictions generated by the regression structure is acceptable. For example, an $R^2$ value being in a particular range may indicate a satisfactory prediction. If the prediction is unacceptable, operation 512 may executed to modify the regression structure and repeat the process from operation 506. If the prediction result is acceptable, operation 514 may be executed. At operation 514, the final regression structure may be determined. At operation 516, confidence intervals of the SOH parameters may be computed. The regression may be configured to ensure that the a true value of the SOH parameters are within a predetermined confidence interval (e.g., 95% confidence interval).

The result of operation 600 may be a regression matrix or function as described above. The regression matrix may define parameters that describe the relationship between vehicle motion during past drive cycles and the resulting current flow through the traction battery. The regression matrix may further define parameters that describe the relationship between vehicle motion during past drive cycles and the resulting changes to the state of health parameters.

The regression matrix or function may be stored or programmed into the controller 206 and is represented by a regression matrix data store 602. At operation 604, vehicle velocity data is collected and stored in a velocity data store 606 during vehicle operation. The velocity data store 606 may be retained in non-volatile memory such that the data is available in subsequent ignition cycles.

At operation 608, the time interval defining the drive cycle may be monitored. For example, the time interval may be defined as a duration of time from initiation of an ignition cycle to initiation of a subsequent ignition cycle of the vehicle. The time interval may be based on a predetermined distance traveled by the vehicle as determined by a monitoring received odometer values over time. The time interval may be defined as a predetermined period of time. For example, the predetermined period of time may be one hour, one day or one week. Time and distance data may be monitored periodically to determine an elapsed time or distance. At operation 610, a check may be performed to determine if the time or distance interval has been achieved. If the interval is not achieved, execution may be repeated from operation 604.

If the interval is achieved, operation 612 may be executed. At operation 612, the statistical parameters may be computed using the stored velocity data 606 as input. The statistical parameters include the mean positive velocity and standard deviation of acceleration. At operation 614, the battery SOH parameter may be computed based on the regression matrix 602 and the statistical values. The controller 206 may further receive temperature data associated with the drive cycle. The estimated value may further be changed based on the temperature data. At operation 616, the traction battery may be operated according the estimated SOH values. The process may be repeated over a lifetime of the vehicle and traction battery.

The system and method described may be beneficial in that battery SOH parameters are estimated from easily obtainable drive cycle data. Further, the results are based on statistical results and may be configured to estimate the values with a predetermined amount of accuracy. Traction battery operating limits may be set according to the estimated battery SOH parameters. For example, battery capacity may be used to determine changes in SOC based on a current integration. Using an accurate battery capacity may ensure the battery SOC is accurate. In addition, the battery capacity may be used to set SOC operating windows to ensure that adequate battery power is available over the vehicle lifetime. In addition, an indicator of battery age that is based on the SOH parameters may be output and displayed to the operator.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a traction battery; and
   a controller programmed to operate the traction battery according to an estimated value of a state of health parameter and to change the estimated value based on statistical parameters, including a mean positive velocity of the vehicle, describing vehicle motion during a drive cycle and parameters describing a relationship between vehicle motion during past drive cycles and resulting current flow through the traction battery.

2. The vehicle of claim 1 wherein the state of health parameter is a capacity of the traction battery.

3. The vehicle of claim 1 wherein the state of health parameter is an internal impedance of the traction battery.

4. The vehicle of claim 1 wherein the statistical parameters include a standard deviation of acceleration of the vehicle.

5. The vehicle of claim 1 wherein the controller is further programmed to change the estimated value based on a second set of statistical parameters describing current flow through the traction battery during the drive cycle and parameters describing a relationship between current flow through the traction battery during past drive cycles and the state of health parameter.

6. The vehicle of claim 1 wherein the controller is further programmed to receive battery temperature data and change the estimated value further based on a battery temperature profile collected during the drive cycle.

7. The vehicle of claim 1 wherein the parameters describing the relationship are derived from a regression function such that that the estimated value is within a predetermined confidence interval of a true value of the state of health parameter.

8. A vehicle power system comprising:
   a controller programmed to operate a traction battery according to an estimated value of a state of health parameter and to change the estimated value based on statistical parameters, including a standard deviation of acceleration of the vehicle, describing vehicle motion during a drive cycle and parameters describing a relationship between vehicle motion during past drive cycles and resulting changes to the state of health parameter.

9. The system of claim 8 wherein the state of health parameter is a capacity of the traction battery.

10. The system of claim 8 wherein the state of health parameter is an internal impedance of the traction battery.

11. The system of claim 8 wherein the statistical parameters include a mean positive velocity of the vehicle.

12. The system of claim 8 wherein the controller is further programmed to receive battery temperature data and change the estimated value further based on a battery temperature profile collected during the drive cycle.

13. The system of claim 8 wherein the parameters describing the relationship are derived from a regression function such that that the estimated value is within a predetermined confidence interval of a true value of the state of health parameter.

14. A method of operating a battery in a vehicle comprising:
   operating, by a controller, the battery according to an estimated value of a battery state of health parameter; and
   changing, by the controller, the estimated value based on statistical parameters including a standard deviation of vehicle acceleration, describing vehicle motion during a drive cycle and parameters describing a relationship between vehicle motion during past drive cycles and resulting current flow through the battery.

15. The method of claim 14 further comprising changing, by the controller, the estimated value further based on a battery temperature profile collected during the drive cycle.

16. The method of claim 14 further comprising changing, by the controller, the estimated value further based on statistical parameters describing current flow through the battery during the drive cycle and parameters describing a relationship between current flow through the battery during past drive cycles and the state of health parameter.

17. The method of claim 14 further comprising describing the relationship according to a regression function such that that the estimated value is within a predetermined confidence interval of a true value of the battery state of health parameter.

* * * * *